US012695468B2

(12) United States Patent
Taylor et al.

(10) Patent No.: US 12,695,468 B2
(45) Date of Patent: Jul. 28, 2026

(54) PHASE KEEPING METHOD TO MITIGATE TEMPERATURE RELATED PHASE BIAS CHANGES IN DUTY CYCLED ARRAY

(71) Applicant: L3Harris Technologies, Inc., Melbourne, FL (US)

(72) Inventors: Michael Paul Taylor, Rockwall, TX (US); Hector Quiroz Ontiveros, Princeton, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 223 days.

(21) Appl. No.: 18/776,829

(22) Filed: Jul. 18, 2024

(65) Prior Publication Data

US 2026/0025155 A1     Jan. 22, 2026

(51) Int. Cl.
*H04B 1/00* (2006.01)
*H04B 1/12* (2006.01)
*H04B 1/16* (2006.01)

(52) U.S. Cl.
CPC ............... *H04B 1/001* (2013.01); *H04B 1/12* (2013.01); *H04B 1/16* (2013.01)

(58) Field of Classification Search
CPC ............. H04B 1/001; H04B 1/12; H04B 1/16
See application file for complete search history.

(56) References Cited

U.S. PATENT DOCUMENTS

| | | | |
|---|---|---|---|
| 10,725,142 B2 * | 7/2020 | Feineman ................. | G01S 3/74 |
| 2011/0267216 A1 * | 11/2011 | Smith ..................... | G01S 3/023 |
| | | | 342/174 |
| 2019/0302218 A1 | 10/2019 | Zarubica et al. | |

* cited by examiner

*Primary Examiner* — Nguyen T Vo

(74) *Attorney, Agent, or Firm* — Edell, Shapiro & Finnan, LLC

(57)     ABSTRACT

An apparatus comprises: antennas to each receive energy across a radio frequency range; a controller; and receiver channels configured to (i) when energized, pass the energy received by corresponding ones of the antennas to the controller with phase responses that vary with temperature, and (ii) when de-energized, not pass the energy; wherein the controller is configured to perform: operating one or more first receiver channels of the receiver channels in an operational mode that continuously energizes each first receiver channel; and operating second receiver channels of the receiver channels that are not in the operational mode in a phase-keeping mode that cyclically energizes and de-energizes each second receiver channel to maintain temperature equilibrium across the second receiver channels.

20 Claims, 6 Drawing Sheets

300

PHASE KEEPING IS ENABLED

PHASE KEEPING MONITOR

P1

MONITOR THE BAND IDLE TIMER

310

312

DID THE BAND IDLE TIMER EXPIRE ?

NO

YES

PHASE KEEPING EXECUTION

P2

BIAS BAND FOR ON TIME (THEN UNBIAS BAND)

316

318

RESET THE BAND IDLE TIMER

YES

320

DID SENSOR SEND A SET BAND ?

NO

314

BAND IDLE TIMER

500

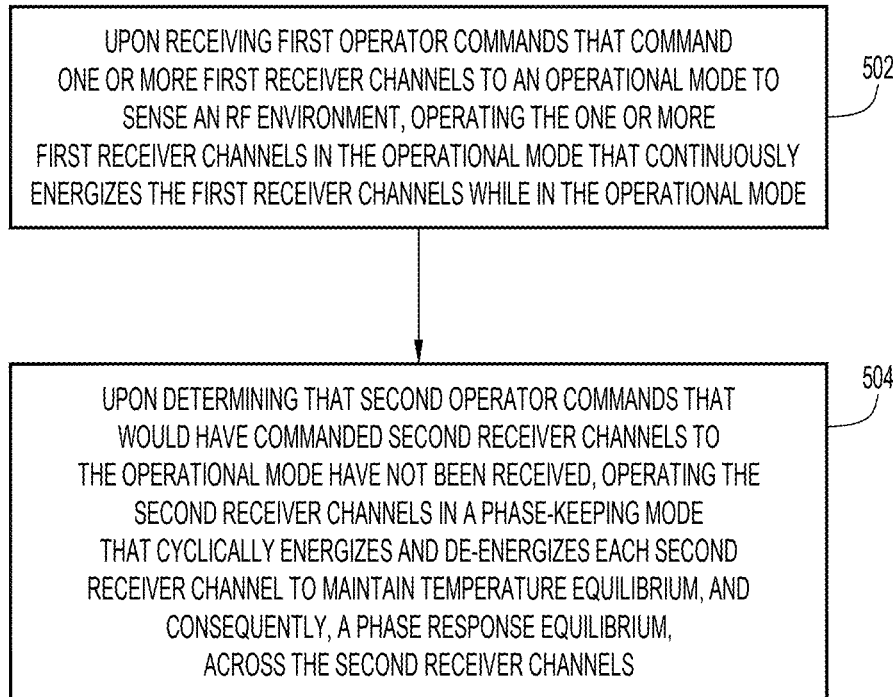

UPON RECEIVING FIRST OPERATOR COMMANDS THAT COMMAND
ONE OR MORE FIRST RECEIVER CHANNELS TO AN OPERATIONAL MODE TO
SENSE AN RF ENVIRONMENT, OPERATING THE ONE OR MORE
FIRST RECEIVER CHANNELS IN THE OPERATIONAL MODE THAT CONTINUOUSLY
ENERGIZES THE FIRST RECEIVER CHANNELS WHILE IN THE OPERATIONAL MODE

502

UPON DETERMINING THAT SECOND OPERATOR COMMANDS THAT
WOULD HAVE COMMANDED SECOND RECEIVER CHANNELS TO
THE OPERATIONAL MODE HAVE NOT BEEN RECEIVED, OPERATING THE
SECOND RECEIVER CHANNELS IN A PHASE-KEEPING MODE
THAT CYCLICALLY ENERGIZES AND DE-ENERGIZES EACH SECOND
RECEIVER CHANNEL TO MAINTAIN TEMPERATURE EQUILIBRIUM, AND
CONSEQUENTLY, A PHASE RESPONSE EQUILIBRIUM,
ACROSS THE SECOND RECEIVER CHANNELS

PHASE KEEPING METHOD TO MITIGATE TEMPERATURE RELATED PHASE BIAS CHANGES IN DUTY CYCLED ARRAY

TECHNICAL FIELD

The present disclosure relates generally to controlling receiver channels of an antenna array.

BACKGROUND

Phase interferometry antenna systems measure a phase difference between radio frequency (RF) collection channels. Such systems typically divide a total operating frequency range into multiple RF channels that are periodically scanned. The phase (or group delay) through an RF channel is highly dependent upon a temperature of the RF components in the RF channel. Size, weight, and power (SWAP) constrained antenna systems often turn off active RF components in unused/non-operational RF channels in order to save power and minimize unnecessary thermal load. However, when the RF components are turned off, their thermal equilibrium changes as the RF components cool down. The change in temperature of the RF components affects the group delay of the RF channel in question and results in inconsistent phase measurements across the RF channels.

BRIEF DESCRIPTION OF THE DRAWINGS

FIG. 5 is a flowchart of an example method of mitigating temperature related phase bias changes in the sensor array system using the phase keeping algorithm.

DESCRIPTION

Overview

Figure 1:
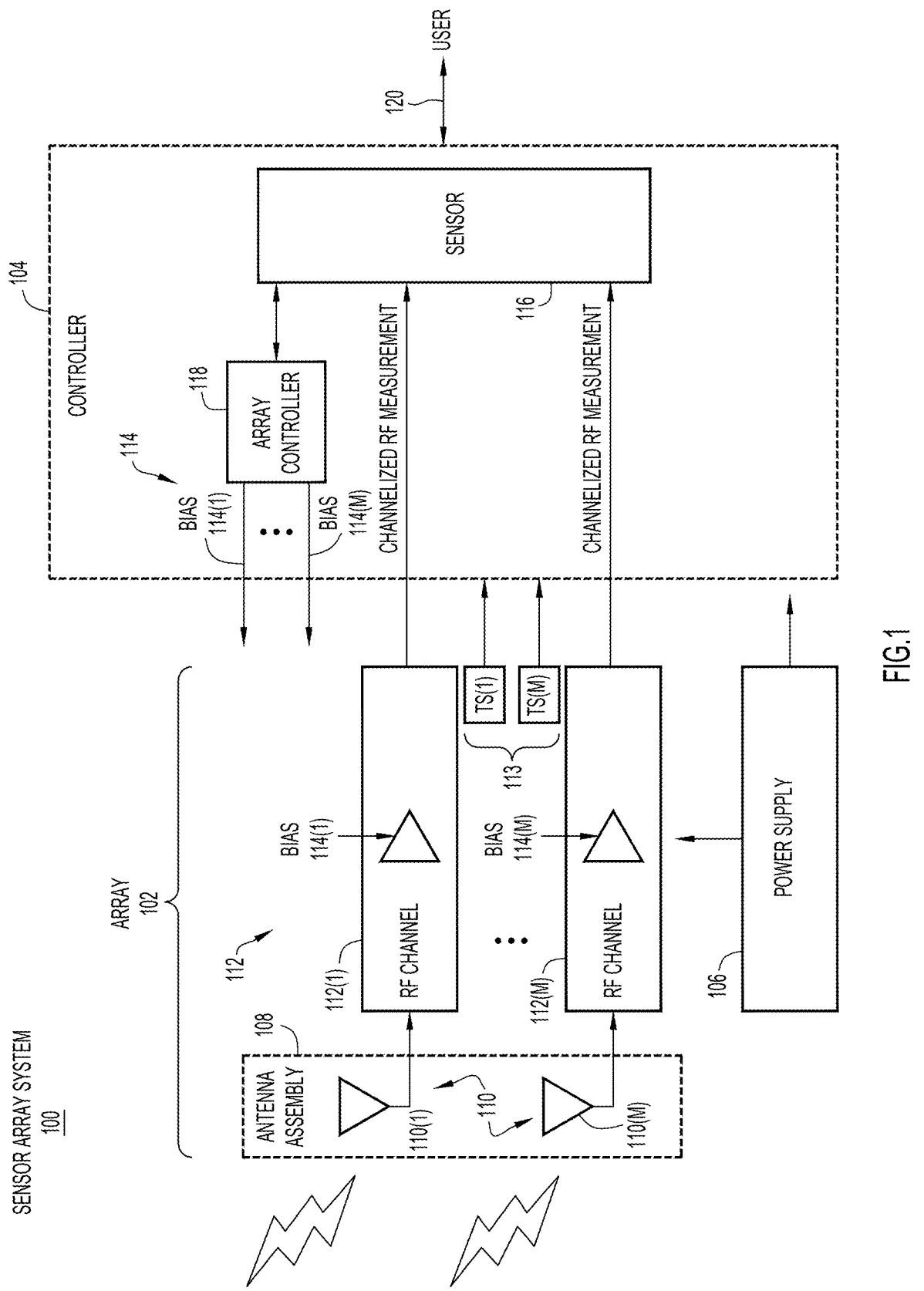
FIG. 1 is a block diagram of an example sensor array system that implements a phase keeping algorithm to mitigate temperature related phase bias change.

In an embodiment, an apparatus comprises: antennas to each receive energy across a radio frequency range; a controller; and receiver channels configured to (i) when energized, pass the energy received by corresponding ones of the antennas to the controller with phase responses that vary with temperature, and (ii) when de-energized, not pass the energy; wherein the controller is configured to perform: operating one or more first receiver channels of the receiver channels in an operational mode that continuously energizes each first receiver channel; and operating second receiver channels of the receiver channels that are not in the operational mode in a phase-keeping mode that cyclically energizes and de-energizes each second receiver channel to maintain temperature equilibrium across the second receiver channels.

EXAMPLE EMBODIMENTS

According to embodiments presented herein, a sensor array system (e.g., an antenna system) with multiple RF channels applies a phase keeping algorithm to unused or "non-operational" RF channels among the RF channels that are not being used for phase interferometry measurements (also referred to more simply as "phase measurements"). The phase keeping algorithm maintains thermal equilibrium (and thus equivalent phase responses) across the unused RF channels. The phase keeping algorithm ensures a consistent phase response across the unused RF channels when they are subsequently brought into use or operation.

The phase keeping algorithm automatically detects when RF channels are not in use, iterates through the unused RF channels, biasing (i.e., energizing) each unused RF channel for a short period of time. After an unused RF channel is biased for the short period time, the phase keeping algorithm unbiases (i.e., de-energizes) the unused RF channel before biasing a next unused RF channel. This is repeated in a sequential round-robin fashion. The thermal resistivity of the RF channels affect the duty cycle applied to achieve thermal equilibrium. Therefore, the duty cycle is configurable to account for such differences in thermal resistivity across different RF channel configurations.

The above-mentioned automatic duty cycling of unused (i.e., non-operational) RF channels allows them to maintain thermal equilibrium with each other over time. Thus, RF paths of the unused RF channels maintain consistent phase responses (e.g., group delays), which results in consistent and accurate phase measurements when the unused RF channels transition to used (i.e., operational) RF channels to make the phase measurements.

The phase keeping algorithm includes configuration/programmable parameters that establish how often the RF channels are normally used. When the parameters are exceeded, the phase keeping algorithm automatically enters phase keeping operation. Once entered, the phase keeping operation cyclically energizes and de-energizes each unused RF channel to maintain the thermal equilibrium of the RF channel. The parameters also establish the duty cycle with which each unused RF channel is cycled.

An advantage of the phase keeping algorithm is that is allows for asymmetric or non-balanced use of the RF channels, and enables dynamic calibration activities to be performed less often. This inherently increases both the phase measurement accuracy of the sensor array system and also increases a probability of intercept of signals in the RF environment by reducing the down-time spent on performing dynamic calibrations of the RF channels.

FIG. 1 is a block diagram of an example sensor array system 100 that implements a phase keeping algorithm (referred to simply as "phase keeping") to mitigate temperature related phase bias changes. In an example, sensor array system 100 may be employed for phase interferometry, although other uses are possible. Sensor array system 100 includes an array 102, a controller 104 coupled to the array, and a power supply 106 to provide power to the array and the controller. Array 102 includes an antenna assembly 108 that has antennas 110(1)-110(M) (collectively referred to as "antennas 110") and RF channels 112(1)-112(M) (collectively referred to as "RF channels 112" and "receiver channels") fed by respective ones of the antennas. Antennas 110(1)-110(M) receive RF energy across a wide frequency range and deliver the received RF energy to RF channels 112(1)-112(M) in parallel. RF channels 112(1)-112(M) collectively span the wide frequency range, which is divided among the RF channels. That is, RF channels 112(1)-112(M) are frequency selective RF channels that processes different selected frequency bandwidths of the RF energy. In some arrangements, RF channels 112 may divided among multiple frequency bands of array 102, and may also be grouped into a number of RF modules of the array.

RF channels 112(1)-112(M) also receive respective bias signals 114(1)-114(M) (collectively referred to as "bias signals 114") generated by controller 104. Each bias signal 114(i) selectively biases on (i.e., "energizes," "turns on," or "activates") or unbiases (i.e., "de-energizes," "turns off," or "deactivates") active components (represented by an amplifier symbol) in RF channel 112(i) depending on a state of the bias signal. For example, bias signal 114i has first and second states (e.g., 1 and 0) that respectively energize (i.e., bias on) and de-energize (e.g., bias off) corresponding RF channel 112(i).

When energized, RF channel 112(i) passes channelized RF energy to controller 104 where a phase measurement is performed, for example. In contrast, when de-energized, RF channel 112(i) does not pass the channelized RF energy to controller 104. That is, RF channel 112(i) blocks the channelized RF energy. Each RF channel (e.g., RF channel 112(i)) has a phase response (e.g., introduces a phase delay) that varies with temperature. The temperature of the RF channel rises and falls when the RF channel is energized and de-energized. Thus, the phase response of the RF channel changes when the RF channel is energized and de-energized. As a result, RF channels that are not in temperature equilibrium with each other have phase responses that differ based on their temperatures that differ (referred to as temperature related phase bias changes), which can lead to inaccurate phase interferometry results. As will be described below, the phase keeping algorithm mitigates the temperature related phase bias change to achieve more accurate phase interferometry results.

Array 102 also includes temperature sensors (e.g., thermistors) TS(1)-TS(M) (collectively referred to as temperature sensors 113) to sense temperatures of corresponding ones of RF channels 112(i)-112(M), and provide corresponding temperature measurements or readings to controller 104.

Controller 104 includes a sensor 116 (also referred to as a "sensor processor") and an array controller 118 that communicates with the sensor. Controller 104 interacts with an operator through an operator interface 120. For example, the operator may submit operator commands to controller 104, and the controller may provide status and results to the operator, over operator interface 120. Responsive to the operator commands, and interactions with sensor 116, array controller 118 generates bias signals 114(1)-114(M) and applies the same to corresponding ones of RF channels 112(1)-112(M). At any given time, bias signals 114 may be configured to (i) energize all RF channels 112, (ii) de-energize all the RF channels, and (iii) energize some but not all of the RF channels, and de-energize some but not all of the RF channels.

High-level operations of sensor array system 100 are now described in the context of an example operational scenario, in which controller 104 receives operator commands that command one or more RF channels to an "operational mode." An RF channel that operates in the operational mode is referred to as an "operational" RF channel. Upon receiving the operator commands, controller 104 (specifically, array controller 118) configures bias signals 114 to continuously energize the one or more RF channels for as long as they remain in the operational mode (e.g., until the controller receives contrary operator commands to transition the one or more RF channels to a non-operational mode). Continuously energizing the RF channels while in the operational mode (i.e., while operational) is referred to as "normal operational" control. While continuously energized, the one or more operational RF channels continuously provide/pass their channelized RF measurements (e.g., phase measurements) to sensor 116, which processes the same for direction finding or other purposes. In addition, while energized, the temperatures of the operational RF channels rise, which affects their phase responses.

Remaining RF channels that are not commanded to the operational mode and that do not operate in the operational mode are referred to as "non-operational" RF channels. Even though the non-operational RF channels are not intended to be used to sense the RF environment continuously like the operational channels, controller 104 does not continuously de-energize the non-operational RF channels, which would normally cause their temperatures to fall, and contribute to temperature-based phase response differentials. Rather, controller 104 applies the phase keeping across the non-operational RF channels (but not the operational RF channels) to raise, maintain, and equalize their temperatures (and thus phase responses).

More specifically, the phase keeping detects the non-operational RF channels, and cyclically energizes and de-energizes each non-operational RF channel with a predetermined duty cycle. Cyclically energizing and de-energizing a non-operational RF channel is referred to as "phase-keeping cycling" of the non-operational RF channel. In an example, the phase keeping performs phase-keeping cycling of the non-operational RF channels sequentially, i.e., one after the other. The phase-keeping cycling of each non-operational RF channel maintains a thermal equilibrium (and phase response) across the non-operational RF channels over time without continually biasing the non-operational channels, and reduces a differential temperature between the operational and non-operational RF channels. At various times, the operator may request to transition some of the non-operational RF channels to the operational mode (i.e., to operational RF channels), and vice versa. The phase keeping dynamically detects such changes/transitions, and applies the phase-keeping cycling to the new non-operational RF channels, and removes the phase-keeping cycling from the new operational RF channels.

Figure 2:
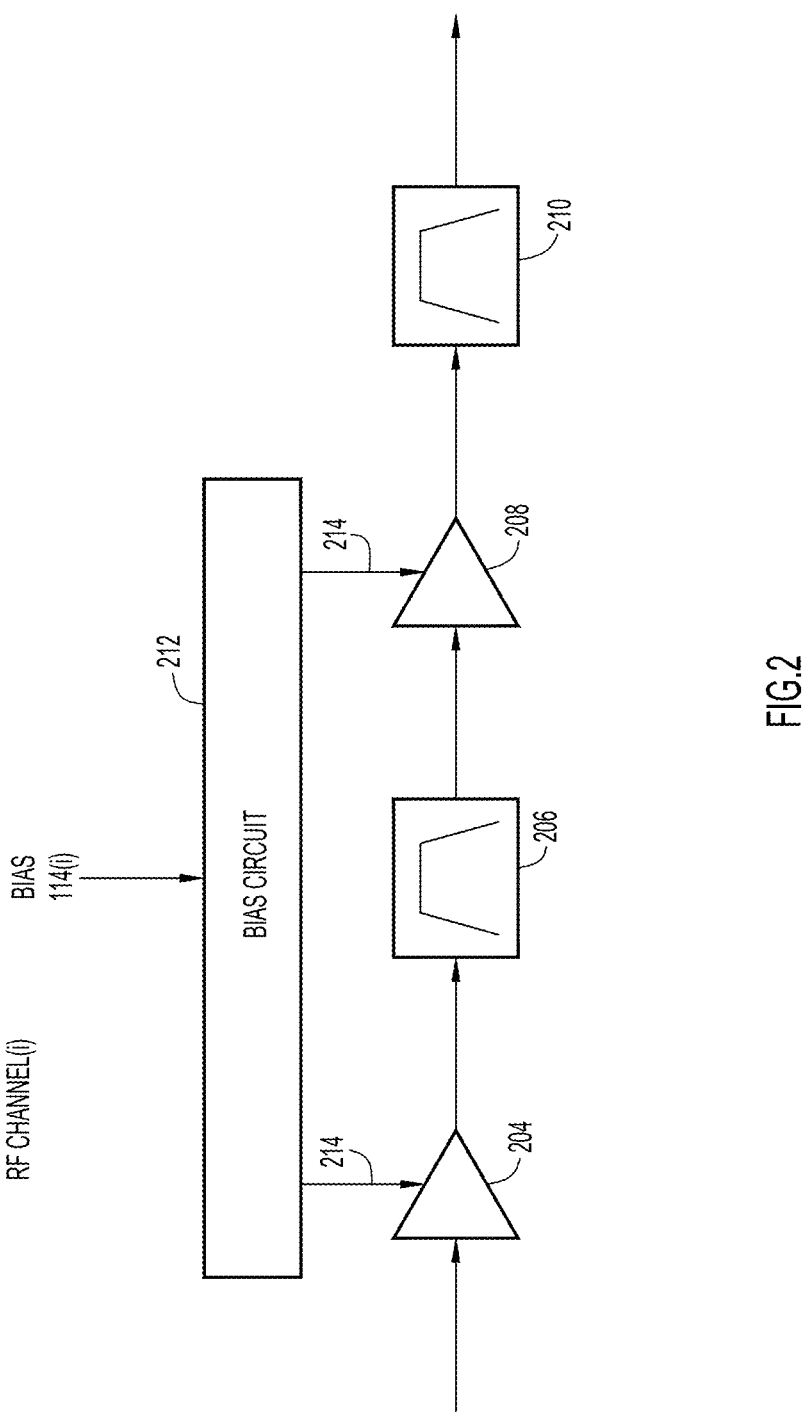
FIG. 2 is a block diagram of an example RF channel of the sensor array system.

FIG. 2 is a block diagram of each RF channel (i) according to an embodiment. RF channel (i) includes the following example RF components that channelize and process RF energy delivered to the RF channel, to produce processed/channelized RF energy to be delivered to sensor 116 as a channelized RF measurement (e.g., a channelized phase measurement): an amplifier 204; a bandpass filter 206 having a bandpass filter response centered about a center frequency of the RF channel; an amplifier 208; and a bandpass filter 210 having a bandpass filter response centered about the center frequency of the RF channel. Other RF components may be used; for example, one or both of the bandpass filters may be omitted, or only one amplifier may be used. In an example, amplifiers 204 and 208 represent active components of RF channel (i). RF channel (i) further includes a bias circuit 212. Bias circuit 212 receives bias signal 114(i) and may also receive power voltage and/or current from power supply 106. When the state of bias signal 114(i) is set to energize RF channel (i), bias circuit 212 generates bias currents and/or voltages 214 to bias on (i.e., turn on) the active components. In contrast, when the state of bias signal 114(i) is set to de-energize RF channel (i), bias circuit 212 does not generate the bias currents and/or voltages 214 that would otherwise turn on the active components, which remain turned off. When the active components are biased on, the temperature of RF channel (i) rises.

Conversely, when the active components are biased off, the temperature of RF channel (i) falls.

As mentioned above, the normal operational control continuously energizes each operational RF channel to sense the RF environment for the entire period over which each RF channel remains operational, i.e., in use. The phase keeping executes in parallel with (e.g., as a background operation to) the normal operational control. The phase keeping detects (i.e., searches for) any non-operational RF channels, and then performs phase-keeping cycling of each non-operational RF channel that is detected, as is further described below in connection with FIG. 3.

Figure 3:
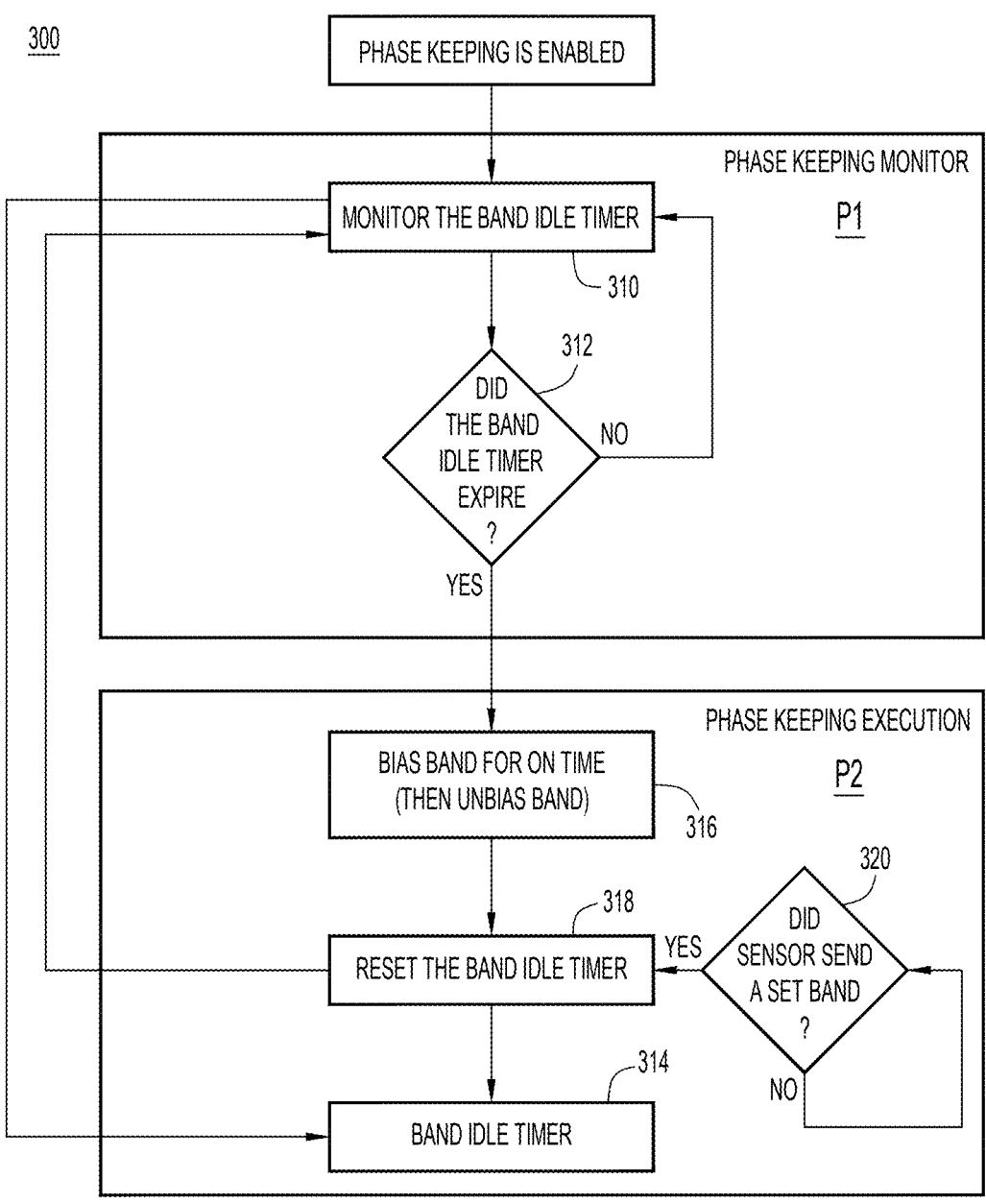
FIG. 3 shows example operations used by the phase keeping algorithm to monitor an RF channel for a non-operational condition.

FIG. 3 shows example operations 300 used by the phase keeping to monitor each RF channel (i) for the non-operational condition. Operations 300 may be performed primarily by array controller 118 and sensor 116. The example of FIG. 3 assumes that the phase keeping is enabled. Another assumption is that when controller 104 receives an operator command that commands RF channel (i) to the operational mode (i.e., to make RF channel (i) operational), sensor 116 repeatedly sends a "set band" (also referred to as a "set channel") command directed to RF channel (i) to array controller 118, until the operator commands the controller otherwise. Repeated sending of the set band command indicates that RF channel (i) is to be maintained as operational. Responsive to repeated receipt of the set band command, array controller 118 continuously energizes RF channel (i) as part of the normal operational control, as mentioned above. Thus, RF channel (i) becomes an operational RF channel. In the event that controller 104 does not receive the operator command to make RF channel (i) operational, sensor 116 does not repeatedly send the set band command to array controller 118, and the array controller does not continuously energize the RF channel. In that case, the RF channel becomes or is deemed non-operational.

The phase keeping includes two main components, a phase keeping monitor P1, and phase keeping execution P2. At 310 and 312, phase keeping monitor P1 detects whether a band idle timer 314 (depicted at the bottom of the phase keeping execution block) dedicated to RF channel (i) has expired. In an example, band idle timer 314 (also referred to a "channel idle timer") may be a programmable timer (e.g., a 20 second timer) that counts down to its expiry or timeout period (e.g., 20 seconds), unless the band idle timer is reset (e.g., by receipt of the set band command), as described below. Under one condition, non-expiry of band idle timer 314 indicates that the set band command is being received and that RF channel (i) is operational, in which case processing flow remains in phase keeping monitor P1, and phase-keeping cycling is not invoked.

On the other hand, expiry of band idle timer 314 indicates that the set band command has not been received within the timeout period, and that RF channel (i) is non-operational. Upon expiry of band idle timer 314, processing flow proceeds to phase keeping execution P2, to initiate phase-keeping cycling, as follows. At 316, phase keeping execution P2 energizes non-operational RF channel (i) for a predetermined on time (e.g., 10 seconds), and processing flow proceeds to 318, which resets and restarts band idle timer 314, and then processing flow proceeds back to phase keeping monitoring P1, where the process repeats. The predetermined on time is stored in memory and is programmable. Meanwhile, after expiry of the predetermined on time invoked at 316, array controller 118 de-energizes RF channel (i). Additionally, receipt of the set band command at 320 also resets band idle timer 314.

So long as the set band command is not received, thereby indicating that RF channel (i) continues to be non-operational, processing flow toggles between phase keeping monitor P1 and phase keeping execution P2. The toggling establishes a duty cycle of the phase-keeping cycling as follows:

a. An on time equal to the predetermined on time invoked at 316.

b. An off time (following the on time) that (i) begins when the predetermined on time (invoked at 316) expires, and (ii) ends when band idle timer 314 next expires, as detected at 312.

Toggling between P1 and P2 is referred to as operating in the phase-keeping mode to implement phase-keeping cycling on non-operational RF channel (i). In summary, failure to receive a set band command for RF channel (i) for the timeout period of band idle timer 314 indicates that RF channel (i) is non-operational. The non-operational indication initiates phase-keeping cycling of RF channel (i). The phase-keeping cycling has a duty cycle established by the on time invoked at 316, and an off time that spans an interval from the expiry of the on time to the next expiry of band idle timer 314. On the other hand, receipt of the set band command within the timeout period indicates that RF channel (i) is operational, and phase-keeping cycling is not invoked.

In another embodiment, operations 300 monitor a temperature of RF channel (i). When RF channel (i) is deemed non-operational because the operator command that commands the RF channel to the operational mode has not been receive, and the temperature falls below a threshold temperature, operations 300 begin phase-cycling of the RF channel.

Figure 4:
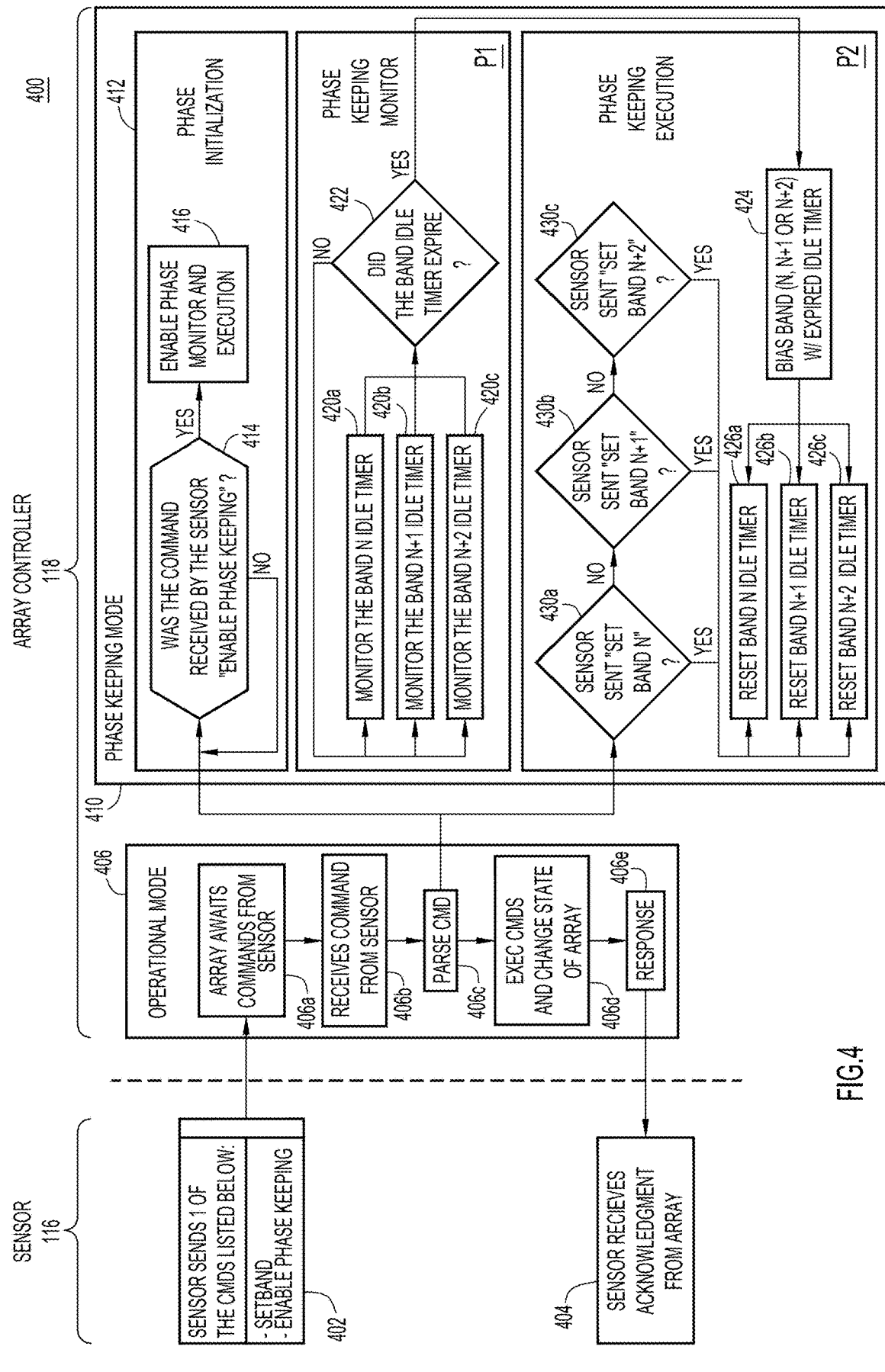
FIG. 4 is a flow diagram of example operations of the phase keeping algorithm as applied across multiple RF channels.

FIG. 4 is a flow diagram of example operations 400 of the phase keeping as applied across multiple RF channels. Operations 400 may be performed across sensor 116 and array controller 118.

At 402, sensor 116 sends to array controller 118 commands to include any of (i) a set band command to make an RF channel operational, and (ii) an enable phase keeping command to enable the phase keeping. At 404, sensor 116 receives from array controller 118 acknowledgements of receipt of the aforementioned commands by the array controller.

At 406, array controller 118 implements a command processing interface (referred to as "operational mode") to process commands from sensor 116. At 406a, 406b, 406c, 406d, and 406e, the command processing interface respectively awaits commands from sensor 116, receives a command from the sensor, parses the command from the sensor, executes the command from the sensor (which may change a state of an RF channel), and submits a response to the sensor.

Array controller 118 further implements operations 410 of the phase keeping algorithm (also referred to as the "phase keeping mode"). Operations 410 of the phase keeping include phase initialization 412, phase keeping monitor P1, and phase keeping execution P2. FIG. 4 expands on the operations of the phase monitor P1 and phase keeping execution P2 shown in FIG. 3.

Operations 414 and 416 of phase initialization 412 test whether the phase keeping enable command was received from sensor 116, and enable the phase keeping when the command is received.

Phase keeping monitor P1 and phase keeping execution P2 operate across each of multiple RF channels in the same manner that the phase keeping monitor and the phase keeping execution operate on the single RF channel described in connection with FIG. 3. In the example of FIGS. 4, (420*a* and 422), (420*b* and 422), and (420*c* and 422) of phase keeping monitor P1 respectively monitor individual band N, band N+1, and band N+2 idle timers for RF channels N, N+1, and N+2. When one of the band idle timers expires to indicate that a corresponding one of the RF channels is non-operational, processing flow proceeds from 422 to 424 of phase keeping execution P2, to initiate phase-keeping cycling of the non-operational RF channel.

More specifically, 424 energizes the non-operational RF channel for the predetermined on time, and flow processing proceeds to a corresponding one of 426*a*, 426*b*, and 426*c*, which respectively reset a corresponding one of the band N, band N+1, and band N+2 idle timers. Processing flow proceeds from the corresponding one of 426*a*, 426*b*, and 426*c* back to phase keeping monitor P1 (as was also described in connection with FIG. 3). Meanwhile, upon expiry of the predetermined on time invoked at 424, the non-operational RF channel is de-energized, hence completing one full on/off phase-keeping cycle.

In addition, tests 430*a*, 430*b*, 430*c* of phase keeping execution P2 respectively test for receipt of set band commands from sensor 116 for RF channels N, N+1, and N+2 and, when received, execute corresponding ones of 426*a*, 426*b*, and 426*c*.

FIG. 5 is a flowchart of an example method 500 of mitigating temperature related phase bias changes in a sensor array system (e.g., sensor array system 100) (also referred to as an "apparatus") using a phase keeping algorithm. The sensor array system includes antennas to each receive energy across a radio frequency range, a controller, and receiver channels (e.g., RF channels) configured to (i) when energized, pass the energy received by corresponding ones of the antennas to the controller with phase responses that vary with temperature, and (ii) when de-energized, not pass the energy. Various aspects of operations of method 500 have been described above.

The method includes, upon receiving first operator commands that command one or more first channels of the receiver channels to an operational mode, at 502, operating the one or more first channels in the operational mode. The operational mode continuously energizes each second receiver channel to continuously sense RF and provided channelized measurements of the same to the controller. The one or more first channels may be referred to as "one or more continuously energized (or biased) operational channels."

The method further includes, upon determining that second operator commands that command second receiver channels of the receiver channels to the operational mode have not been received, at 504, operating the second receiver channels in a phase-keeping mode that cyclically energizes and de-energizes each second receiver channel at a duty cycle to maintain temperature equilibrium, and conse-quently, a phase response equilibrium, across the second receiver channels. The second channels may be referred to as "periodically energized (or biased) and de-energized (or unbiased) non-operational channels." The phase-keeping mode may cyclically energizes and de-energizes the second receiver channels sequentially in a round-robin fashion, or all concurrently.

The determining may include monitoring a time period over which each second operator command has not been received, and when the time period exceeds a predetermined timeout period, operating a corresponding one of each second receiver channel in the phase-keeping mode.

Additionally, the method includes, upon determining that operator commands commanding the first channels to the operational mode are no longer received (or that operator commands commanding the first channels to the non-opera-tional mode are received), transitioning the first channels to the phase keeping mode.

In addition, the method may include monitoring a tem-perature of each second receiver channel, and when the temperature falls below a threshold, operating a correspond-ing one of each second receiver channel in the phase-keeping mode. In addition, the method may include storing first mappings between temperatures and (programmable) duty cycles and, when the temperature falls below the threshold, selecting a duty cycle based on the temperature. The phase-keeping mode cyclically energizes and de-ener-gizes the corresponding one of each second receiver channel at the duty cycle.

The method may further include storing second mappings between (programmable) duty cycles and RF channel resis-tivities, and selecting a duty cycle based on the resistivity.

Figure 6:
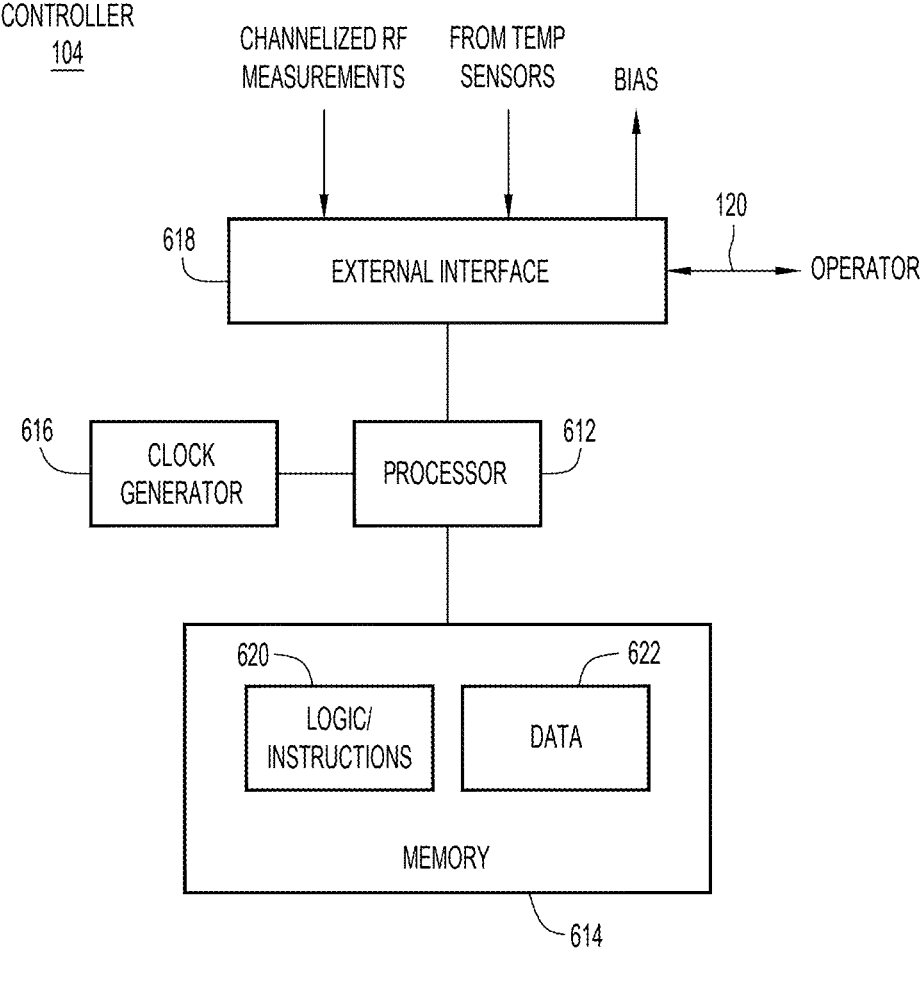
FIG. 6 is a block diagram of a controller of the sensor array system according to an embodiment.

With reference to FIG. 6, there is a block diagram of controller 104 according to an embodiment. Controller 104 includes one or more processor(s) 612 (e.g., microcontroller (s)) (which may be implemented in hardware, software, or a combination thereof), a memory 614, a clock generator 616, and external interfaces 618 coupled with each other. Pro-cessor(s) 612 receive channelized RF measurements from RF channels 112 and temperature measurements from tem-perature sensors 113 through external interfaces 618, pro-vide bias signals 114 to RF channels 112 through the external interfaces, and communicate with the operator through the external interfaces.

Memory 614 may include read only memory (ROM), random access memory (RAM), magnetic disk storage media devices, optical storage media devices, flash memory devices, electrical, optical, or other physically tangible (i.e., non-transitory) memory storage devices. Memory 614 stores non-transitory computer readable program instructions/logic instructions 620 that, when executed by processor(s) 612, cause the processor(s)/controller 104 to perform the opera-tions described herein. For example, memory 614 includes logic to perform (i) the normal operational control, (ii) the phase keeping algorithm, and (iii) sensor processing of the channelized RF measurements for direction finding and the like. Memory 614 also stores data 622 used and produced by processor 612.

Clock generator 616 generates clocks and timing signals for timers and the like. In embodiments, components of controller 104 may include electronic circuitry such as, for example, programmable logic circuitry, field-programmable gate arrays (FPGA), or programmable logic arrays (PLA) to execute the computer readable program instructions, which may include microcode, firmware, and so on.

In some aspects, the techniques described herein relate to an apparatus including: antennas to each receive energy across a radio frequency range; a controller; and receiver channels configured to (i) when energized, pass the energy received by corresponding ones of the antennas to the controller with phase responses that vary with temperature, and (ii) when de-energized, not pass the energy; wherein the controller is configured to perform: operating one or more first receiver channels of the receiver channels in an opera-tional mode that continuously energizes each first receiver channel; and operating second receiver channels of the receiver channels that are not in the operational mode in a phase-keeping mode that cyclically energizes and de-energizes each second receiver channel to maintain temperature equilibrium across the second receiver channels.

In some aspects, the techniques described herein relate to an apparatus, wherein: the phase-keeping mode that cyclically energizes and de-energizes each second receiver channel maintains a phase response equilibrium across the second receiver channels.

In some aspects, the techniques described herein relate to an apparatus, wherein the controller is further configured to perform: upon receiving first operator commands that command the one or more first receiver channels to the operational mode, operating the one or more first receiver channels in the operational mode.

In some aspects, the techniques described herein relate to an apparatus, wherein the controller is further configured to perform: upon determining that second operator commands that command the second receiver channels to the operational mode have not been received, operating the second receiver channels in the phase-keeping mode.

In some aspects, the techniques described herein relate to an apparatus, wherein determining includes: monitoring a time period over which each second operator command has not been received; and when the time period exceeds a predetermined timeout period, operating a corresponding one of each second receiver channel in the phase-keeping mode.

In some aspects, the techniques described herein relate to an apparatus, further including: monitoring a temperature of each second receiver channel; and when the temperature falls below a threshold, operating a corresponding one of each second receiver channel in the phase-keeping mode.

In some aspects, the techniques described herein relate to an apparatus, wherein the controller is further configured to perform: storing mappings between temperatures and duty cycles; and when the temperature falls below the threshold, selecting a duty cycle based on the temperature, wherein the phase-keeping mode cyclically energizes and de-energizes the corresponding one of each second receiver channel at the duty cycle.

In some aspects, the techniques described herein relate to an apparatus, wherein: the phase-keeping mode cyclically energizes and de-energizes each second receiver channel at a predetermined duty cycle.

In some aspects, the techniques described herein relate to an apparatus, wherein the receiver channels each includes an active receiver component, and energizing each second receiver channel includes biasing on the active receiver component.

In some aspects, the techniques described herein relate to an apparatus, wherein: the phase-keeping mode cyclically energizes and de-energizes the second receiver channels sequentially in a round-robin fashion.

In some aspects, the techniques described herein relate to an apparatus, wherein: The phase-keeping mode cyclically energizes and de-energizes the second receiver channels concurrently.

In some aspects, the techniques described herein relate to an apparatus, wherein: the receiver channels are frequency selective receiver channels that collectively span the radio frequency range.

In some aspects, the techniques described herein relate to a method performed by a receiver having antennas to each receive energy across a radio frequency range, a controller, and receiver channels configured to (i) when energized, pass the energy received by corresponding ones of the antennas to the controller with phase responses that vary with temperature, and (ii) when de-energized, not pass the energy, the method including: operating one or more first receiver channels of the receiver channels in an operational mode that continuously energizes each operational channel; and operating second receiver channels of the receiver channels that are not in the operational mode in a phase-keeping mode that cyclically energizes and de-energizes each second receiver channel to a maintain temperature equilibrium across the second receiver channels.

In some aspects, the techniques described herein relate to a method, wherein: the phase-keeping mode that cyclically energizes and de-energizes each second receiver channel maintains a phase response equilibrium across the second receiver channels.

In some aspects, the techniques described herein relate to a method, further including: upon receiving first operator commands that command the one or more first receiver channels to the operational mode, operating the one or more first receiver channels in the operational mode.

In some aspects, the techniques described herein relate to a method, further including: upon determining that second operator commands that command the second receiver channels to the operational mode have not been received, operating the second receiver channels in the phase-keeping mode.

In some aspects, the techniques described herein relate to a method, wherein determining includes: monitoring a time period over which each second operator command has not been received; and when the time period exceeds a predetermined timeout period, operating a corresponding one of each second receiver channel in the phase-keeping mode.

In some aspects, the techniques described herein relate to a method, further including: monitoring a temperature of each second receiver channel; and when the temperature falls below a threshold, operating a corresponding one of each second receiver channel in the phase-keeping mode.

In some aspects, the techniques described herein relate to a method, further including: storing mappings between temperatures and duty cycles; and when the temperature falls below the threshold, selecting a duty cycle based on the temperature, wherein the phase-keeping mode cyclically energizes and de-energizes the corresponding one of each second receiver channel at the duty cycle.

In some aspects, the techniques described herein relate to a method, wherein: the phase-keeping mode cyclically energizes and de-energizes each second receiver channel at a predetermined duty cycle.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
   antennas to each receive energy across a radio frequency range;
   a controller; and
   receiver channels configured to (i) when energized, pass the energy received by corresponding ones of the antennas to the controller with phase responses that vary with temperature, and (ii) when de-energized, not pass the energy;
   wherein the controller is configured to perform:
       operating one or more first receiver channels of the receiver channels in an operational mode that continuously energizes each first receiver channel; and operating second receiver channels of the receiver channels that are not in the operational mode in a phase-keeping mode that cyclically energizes and de-energizes each second receiver channel to maintain temperature equilibrium across the second receiver channels.

2. The apparatus of claim 1, wherein:
the phase-keeping mode that cyclically energizes and de-energizes each second receiver channel maintains a phase response equilibrium across the second receiver channels.

3. The apparatus of claim 1, wherein the controller is further configured to perform:
upon receiving first operator commands that command the one or more first receiver channels to the operational mode, operating the one or more first receiver channels in the operational mode.

4. The apparatus of claim 3, wherein the controller is further configured to perform:
upon determining that second operator commands that command the second receiver channels to the operational mode have not been received, operating the second receiver channels in the phase-keeping mode.

5. The apparatus of claim 4, wherein the controller is configured to perform determining by:
monitoring a time period over which each second operator command has not been received; and
when the time period exceeds a predetermined timeout period, operating a corresponding one of each second receiver channel in the phase-keeping mode.

6. The apparatus of claim 4, wherein the controller is further configured to perform:
monitoring a temperature of each second receiver channel; and
when the temperature falls below a threshold, operating a corresponding one of each second receiver channel in the phase-keeping mode.

7. The apparatus of claim 6, wherein the controller is further configured to perform:
storing mappings between temperatures and duty cycles; and
when the temperature falls below the threshold, selecting a duty cycle based on the temperature,
wherein the phase-keeping mode cyclically energizes and de-energizes the corresponding one of each second receiver channel at the duty cycle.

8. The apparatus of claim 1, wherein:
the phase-keeping mode cyclically energizes and de-energizes each second receiver channel at a predetermined duty cycle.

9. The apparatus of claim 1, wherein the receiver channels each includes an active receiver component, and energizing each second receiver channel includes energizing the active receiver component.

10. The apparatus of claim 1, wherein:
the phase-keeping mode cyclically energizes and de-energizes the second receiver channels sequentially in a round-robin fashion.

11. The apparatus of claim 1, wherein:
The phase-keeping mode cyclically energizes and de-energizes the second receiver channels concurrently.

12. The apparatus of claim 1, wherein:
the receiver channels are frequency selective receiver channels that collectively span the radio frequency range.

13. A method performed by a receiver having antennas to each receive energy across a radio frequency range, a controller, and receiver channels configured to (i) when energized, pass the energy received by corresponding ones of the antennas to the controller with phase responses that vary with temperature, and (ii) when de-energized, not pass the energy, the method comprising:
operating one or more first receiver channels of the receiver channels in an operational mode that continuously energizes each operational channel; and
operating second receiver channels of the receiver channels that are not in the operational mode in a phase-keeping mode that cyclically energizes and de-energizes each second receiver channel to a maintain temperature equilibrium across the second receiver channels.

14. The method of claim 13, wherein:
the phase-keeping mode that cyclically energizes and de-energizes each second receiver channel maintains a phase response equilibrium across the second receiver channels.

15. The method of claim 13, further comprising:
upon receiving first operator commands that command the one or more first receiver channels to the operational mode, operating the one or more first receiver channels in the operational mode.

16. The method of claim 15, further comprising:
upon determining that second operator commands that command the second receiver channels to the operational mode have not been received, operating the second receiver channels in the phase-keeping mode.

17. The method of claim 16, wherein determining includes:
monitoring a time period over which each second operator command has not been received; and
when the time period exceeds a predetermined timeout period, operating a corresponding one of each second receiver channel in the phase-keeping mode.

18. The method of claim 16, further comprising:
monitoring a temperature of each second receiver channel; and
when the temperature falls below a threshold, operating a corresponding one of each second receiver channel in the phase-keeping mode.

19. The method of claim 18, further comprising:
storing mappings between temperatures and duty cycles; and
when the temperature falls below the threshold, selecting a duty cycle based on the temperature,
wherein the phase-keeping mode cyclically energizes and de-energizes the corresponding one of each second receiver channel at the duty cycle.

20. The method of claim 13, wherein:
the phase-keeping mode cyclically energizes and de-energizes each second receiver channel at a predetermined duty cycle.

* * * * *